United States Patent [19]

Ozaki

[11] Patent Number: 4,652,922

[45] Date of Patent: Mar. 24, 1987

[54] NOISE REDUCTION CIRCUIT FOR VIDEO SIGNAL

[75] Inventor: Hidetoshi Ozaki, Chofu, Japan

[73] Assignee: Victor Company of Japan, Ltd., Japan

[21] Appl. No.: 813,592

[22] Filed: Dec. 26, 1985

[30] Foreign Application Priority Data

Dec. 29, 1984 [JP] Japan ................................ 59-281018

[51] Int. Cl.$^4$ ............................................ H04N 5/213
[52] U.S. Cl. ...................................... 358/167; 358/36
[58] Field of Search .................... 358/167, 166, 36, 39

[56] References Cited

U.S. PATENT DOCUMENTS

| | | | |
|---|---|---|---|
| 3,485,942 | 12/1969 | Melchior | 358/36 |
| 4,558,353 | 12/1985 | Hirota | 358/36 |
| 4,563,704 | 1/1986 | Hirota | 358/167 |
| 4,571,613 | 2/1986 | Fukuda | 358/36 |
| 4,587,576 | 5/1986 | Hirota et al. | 358/166 X |
| 4,607,285 | 8/1986 | Hirota et al. | 358/36 X |

*Primary Examiner*—James J. Groody
*Assistant Examiner*—E. Anne Toth
*Attorney, Agent, or Firm*—Andrus, Sceales, Starke & Sawall

[57] ABSTRACT

A noise reduction circuit for video signal comprises a first stage noise eliminating circuit for practically eliminating a noise component in the video signal, and a second stage noise eliminating circuit for eliminating a noise component remaining in an output of the first stage noise eliminating circuit. A video signal which is obtained from the second stage noise eliminating circuit has also been eliminated of a noise component existing immediately after a rise in the video signal, and the output video signal of the second stage noise eliminating circuit has been substantially eliminated of all the noise component.

8 Claims, 11 Drawing Figures

NOISE REDUCTION CIRCUIT FOR VIDEO SIGNAL

BACKGROUND OF THE INVENTION

The present invention generally relates to noise reduction circuits for video signal, and more particularly to a noise reduction circuit which can effectively eliminate a noise component existing immediately after a rise in a luminance signal of a reproduced video signal.

Generally, a noise component is mixed in a video signal which is reproduced from a magnetic tape in a video signal magnetic recording and reproducing apparatus. However, in a recording system of the magnetic recording and reproducing apparatus, especially a high frequency component of a luminance signal of the video signal which is recorded and reproduced is subjected to a pre-emphasis and then to a frequency modulation. For this reason, a frequency of a frequency modulated signal especially at a part immediately after a part (rise) where the luminance signal rapidly changes from a black level to a white level and at a part immediately after a part (fall) where the luminance signal rapidly changes from a white level to a black level is high because of the pre-emphasis performed in the recording system. But in a general magnetic recording and reproducing apparatus, a signal-to-noise (S/N) ratio of a recording and reproducing characteristic is poor in a high frequency range. Hence, the S/N ratio is poor at the parts immediately after the rise and immediately after the fall in the luminance signal, and it is desirable to positively eliminate the noise component existing at such parts of the luminance signal.

Accordingly, a noise reduction circuit for video signal was proposed in a U.S. patent application Ser. No. 389,041 filed June 16, 1982, now U.S. Pat. No. 4,563,704 in which the assignee is the same as the assignee of the present application. This previously proposed noise reduction circuit comprises a first circuit which can eliminate the noise component existing immediately after the rise in the luminance signal waveform and a second circuit which can eliminate the noise component existing immediately before the fall in the luminance signal waveform, and the first and second circuits are coupled in series.

SUMMARY OF THE INVENTION

It is a general object of the present invention to provide a novel and useful noise reduction circuit for video signal, which is a further development of the previously proposed noise reduction circuit.

Another and more specific object of the present invention is to provide a noise reduction circuit for video signal, which is designed to minimize a distortion in a part immediately after a rise in a signal waveform where a noise component is eliminated.

Still another object of the present invention is to provide a noise reduction circuit for video signal, which does not require a delay circuit and has a simple circuit construction, and is especially suited for reducing the noise component in a digital video signal.

Other objects and further features of the present invention will be apparent from the following detailed description when read in conjunction with the accompanying drawings.

BRIEF DESCRIPTION OF THE DRAWINGS

FIGS. 3(A) through 3(E) and FIGS. 4(A) through 4(F) show signal waveforms at various parts of the block system shown in FIG. 1;

FIGS. 10(A) through 10(L) show signals at various parts of the block system shown in FIG. 9.

DETAILED DESCRIPTION

Figure 1:
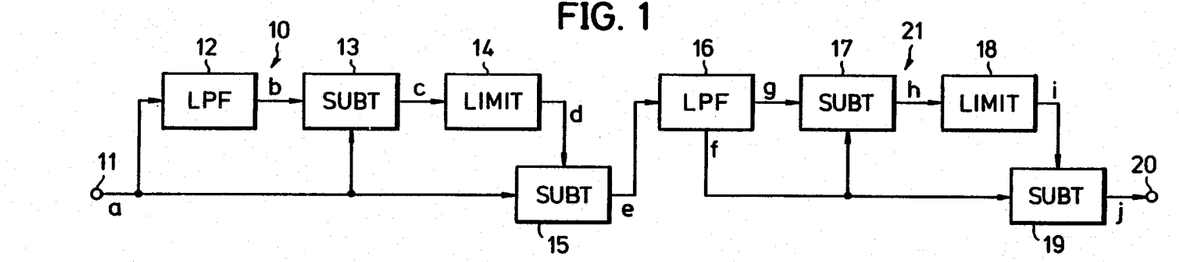
FIG. 1 is a system block diagram showing an embodiment of the noise reduction circuit for video signal according to the present invention.
Figure 2A:
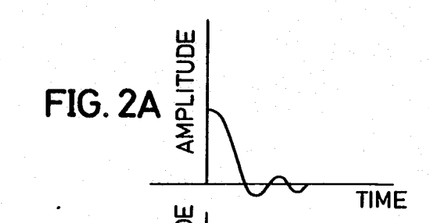
FIGS. 2A and 2B respectively show impulse characteristics of lowpass filters within the block system shown in FIG. 2.
Figure 3:
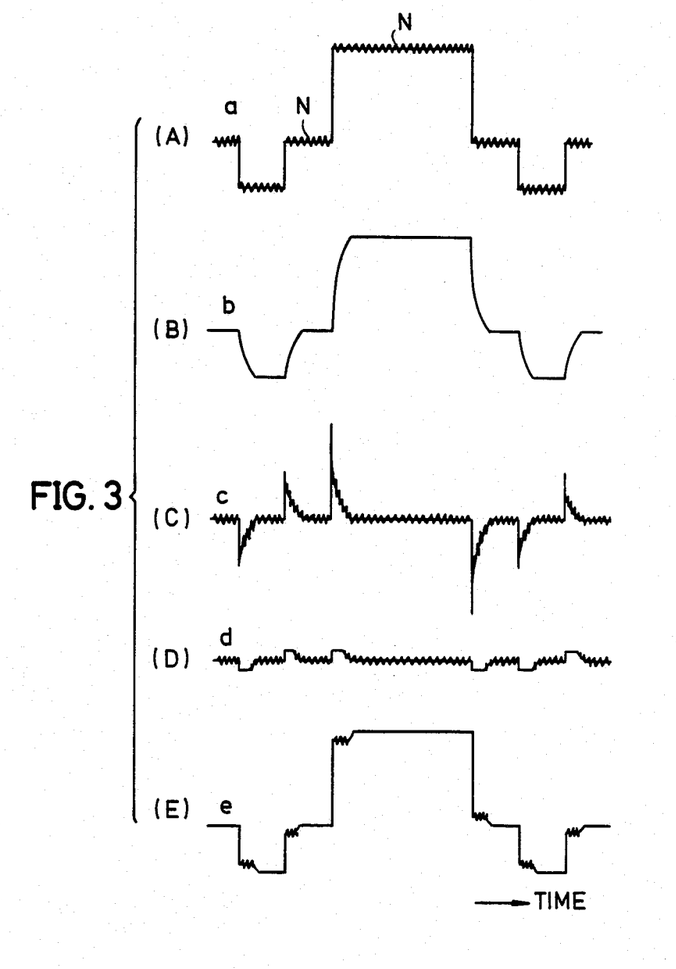

In FIG. 1, an input reproduced luminance signal a which has a waveform shown in FIG. 3(A) and includes a noise component N is applied to an input terminal 11. For example, the luminance signal a is obtained from a video signal which is reproduced from a magnetic tape in a magnetic recording and reproducing apparatus. The luminance signal a is supplied to a lowpass filter 12 wherein the noise component is eliminated. The lowpass filter 12 has an impulse characteristic shown in FIG. 2A wherein the amplitude decreases with time. An output signal b of the lowpass filter 12 having a waveform shown in FIG. 3(B) is supplied to a subtracting circuit 13. The subtracting circuit 13 performs a subtraction between the signal a from the input terminal 11 and the signal b from the lowpass filter 12, and produces a signal c which has a waveform shown in FIG. 3(C) and is largely made up of noise. The signal c is supplied to a limiter 14 wherein large amplitude parts of the signal c are subjected to an amplitude limitation, and the limiter 14 supplies to a subtracting circuit 15 a signal d having a waveform shown in FIG. 3(D). The subtracting circuit 15 performs a subtraction between the signal a from the input terminal 11 and the signal d from the limiter 14, and produces a signal e which has a waveform shown in FIG. 3(E) and is practically eliminated of the noise. However, in the signal e, a noise component still remains at parts immediately after a rise in the signal waveform. These parts of the signal e where the noise component still remain corresponds to the large amplitude parts of the signal c which are amplitude-limited together with the noise component.

Figure 2B:
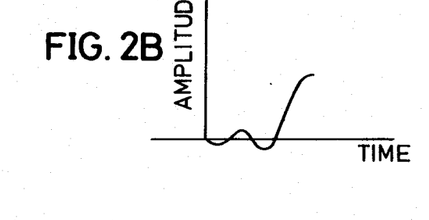
Figure 4:
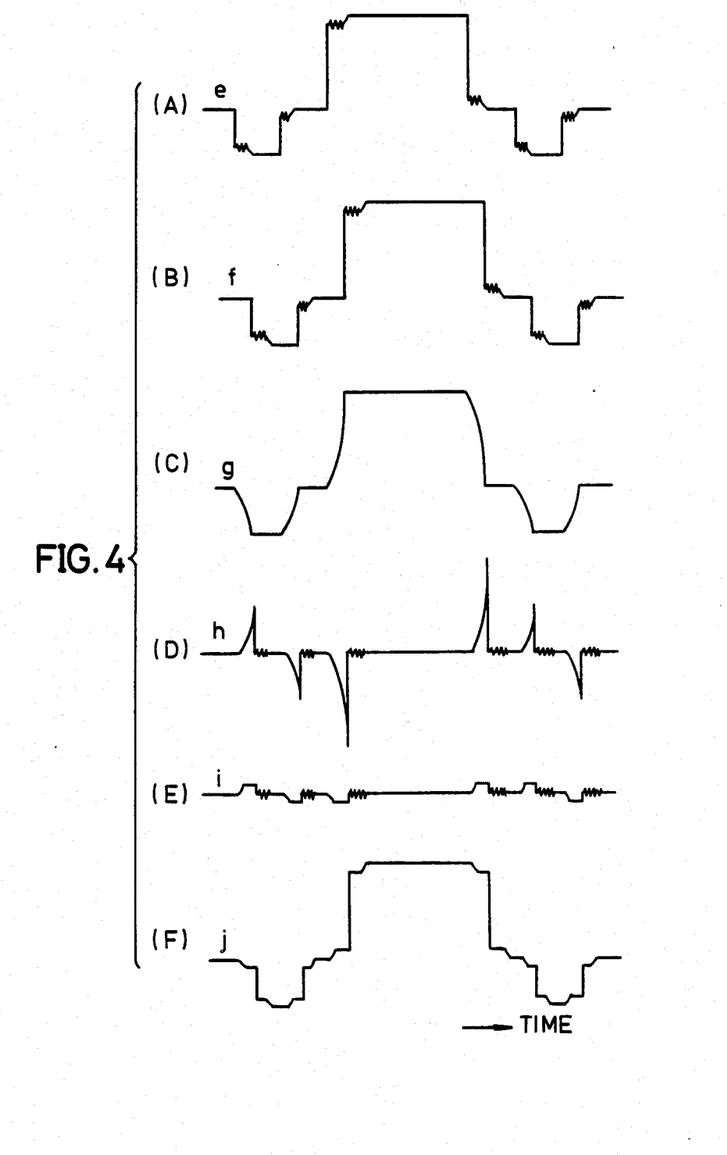

The lowpass filter 12, the subtracting circuit 13, the limiter 14, and the subtracting circuit 15 constitute a first stage noise eliminating circuit 10. The output signal e of the subtracting circuit 15 shown in FIG. 4(A) (identical to the signal e shown in FIG. 3(E)) is supplied to a lowpass filter 16 as an output of the first stage noise eliminating circuit 10. The lowpass filter 16, a subtracting circuit 17, a limiter 18, and a subtracting circuit 19 constitute a second stage noise eliminating circuit 21. The lowpass filter 16 has an impulse characteristic shown in FIG. 2B wherein the amplitude increases with time. The impulse characteristic of the lowpass filter 16 shown in FIG. 2B is complementary to the impulse characteristic of the lowpass filter 12 shown in FIG. 2A. Further, the cutoff frequency of the lowpass filter 16 is the same as the cutoff frequency of the lowpass filter 12. Hence, the lowpass filter 16 produces a signal g having a waveform shown in FIG. 4(C). A signal f having a waveform shown in FIG. 4(B) which is the signal e delayed by a predetermined delay time, is obtained from the lowpass filter 16. A subtracting circuit 17 performs a subtraction between the signals g and f from the lowpass filter 16 and produces a signal h having a waveform shown in FIG. 4(D). The signal h is supplied to a limiter 18 wherein large amplitude parts of the signal h are subjected to an amplitude limitation, and the limiter 18 supplies to a subtracting circuit 19 a signal i having a waveform shown in FIG. 4(E). A subtracting circuit 19 performs a subtraction between the signal f from the lowpass filter 16 and the signal i from the limiter 18 and produces a signal j having a waveform shown in FIG. 4(F). This signal j is obtained through an output terminal 20. As may be seen from FIG. 4(F), the noise component existing at parts immediately after the rise in the signal e is effectively eliminated in the second stage noise eliminating circuit 21, and the signal j does not include the noise component.

Figure 5:
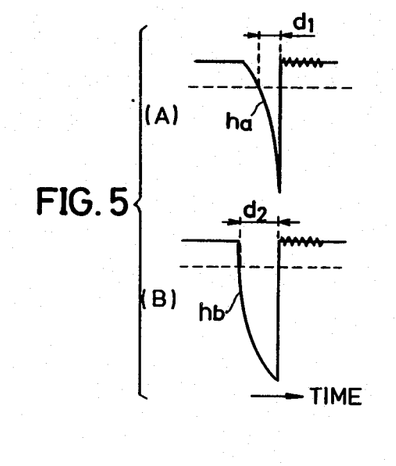
FIGS. 5(A) and 5(B) show waveforms for explaining a distorted part which remains after an amplitude limitation.

If the impulse characteristic of the lowpass filter 16 were approximately the same as the impulse characteristic of the lowpass filter 12, a part $h_a$ of the signal h which is obtained from the subtracting circuit 17 becomes a signal $h_b$ having a waveform shown in FIG. 5(B). In this case, when the large amplitude part of the signal $h_b$ is amplitude-limited to a certain level indicated by a phantom line in the limiter 18 of the subsequent stage, the part of the signal $h_b$ having the certain level, that is, the part which introduces a distortion in the output signal j of the subtracting circuit 19, will have a relatively large width d2. However, according to the present embodiment, the lowpass filter 16 has the impulse characteristic which is complementary to the impulse characteristic of the lowpass filter 12, and thus, the part $h_a$ of the signal h which is obtained from the subtracting circuit 17 has a waveform shown in FIG. 5(A). Hence, when the large amplitude part of the signal $h_a$ shown in FIG. 5(A) is amplitude-limited to the level indicated by the phantom line in the limiter 18 of the subsequent stage, the part which introduces the distortion in the output signal j of the subtracting circuit 19 has a width d1 which is considerably small compared to the width d2 shown in FIG. 5(B). Therefore, the distortion which is undesirably introduced in the signal waveform when the noise component is eliminated, is extremely small according to the present invention.

The luminance signal a applied to the input terminal 11 may either be an analog signal or a digital signal, but the noise reduction circuit according to the present invention is especially suited for the case where the luminance signal is a digital signal.

Figure 6:
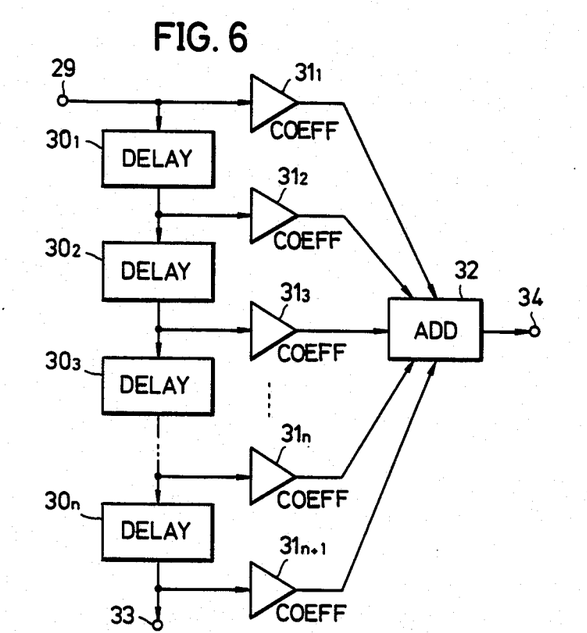
FIGS. 6 and 7 show embodiments of the lowpass filter within the block system shown in FIG. 1.

Next, description will be given with respect to an embodiment of the lowpass filters 12 and 16 by referring to FIG. 6. Lowpass filters having substantially the same circuit construction may be used as the lowpass filters 12 and 16, and for this reason, description will only be given with respect to the case where the lowpass filter shown in FIG. 6 is used as the lowpass filter 16. In FIG. 6, the lowpass filter 16 is a transversal type filter comprising n delay circuits $30_1$ through $30_n$ which are coupled in series, n+1 coefficient multiplying circuits $31_1$ through $31_{n+1}$, and an adding circuit 32. Delay times of the delay circuits $30_1$ through $31_n$ are the same, and multiplying coefficients of the coefficient multiplying circuits $31_1$ through $31_{n+1}$ are set to such values that the impulse characteristic shown in FIG. 2B is obtainable. The output signal e of the first stage noise eliminating circuit 10 (subtracting circuit 15) shown in FIG. 1 is applied to an input terminal 29 and is supplied to the delay circuit $30_1$ and the coefficient multiplying circuit $31_1$. An output signal of the delay circuit $30_1$ is supplied to the coefficient multiplying circuit $31_2$ and the delay circuit $30_2$. Similarly, an output signal of a delay circuit $30_I$ is supplied to a coefficient multiplying circuit $31_{I+1}$ and a delay circuit $30_{I+1}$, where I=1, 2, ..., n−1. An output signal of the delay circuit $30_n$ in the last stage is supplied to an output terminal 33 and the coefficient multiplying circuit $31_{n+1}$. The signal obtained through the output terminal 33 is supplied to the subtracting circuits 17 and 19 shown in FIG. 1 as the delayed signal f described before. Output signals of the coefficient multiplying circuits $31_1$ through $31_{n+1}$ are supplied to the adding circuit 32 and added, and an output signal of the adding circuit 32 is supplied to an output terminal 34. The signal obtained through the output terminal 34 is supplied to the subtracting circuit 17 shown in FIG. 1 as the signal g described before.

The lowpass filter 12 shown in FIG. 1 has a circuit construction which is substantially the same as that of the lowpass filter shown in FIG. 6, however, the signal from the output terminal 33 is not used, and the coefficient multiplying circuits $31_1$ through $31_{n+1}$ having the mutually different multiplying coefficients are arranged in a reverse sequence to that of the coefficient multiplying circuits $31_1$ through $31_{n+1}$ of the lowpass filter 16. That is, when it is assumed that the coefficient multiplying circuits $31_1$ through $31_{n+1}$ respectively have multiplying coefficients $M_1$ through $M_{n+1}$ set in accordance with the impulse characteristic shown in FIG. 2B in the case where the lowpass filter 16 has the circuit construction shown in FIG. 6, multiplying coefficients of the coefficient multiplying circuits $31_1$ through $31_{n+1}$ are reversed and respectively set to $M_{n+1}$ through $M_1$ in the case where the lowpass filter 12 has the circuit construction shown in FIG. 6 so that the impulse characteristic shown in FIG. 2A is obtainable.

Figure 7:
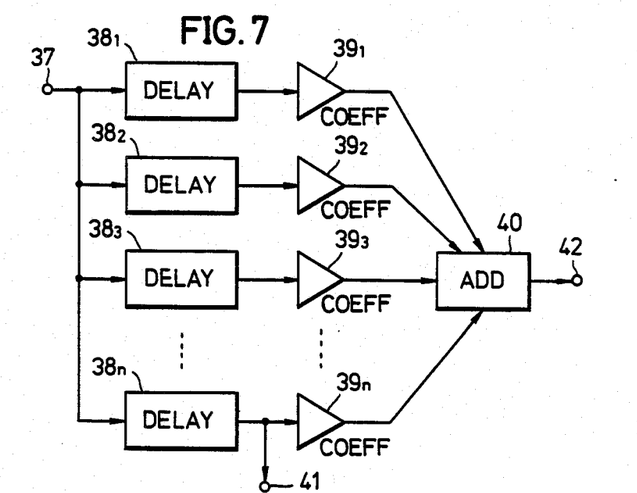

FIG. 7 shows another embodiment of the lowpass filters 12 and 16. In the case where the lowpass filter is used as the lowpass filter 16 shown in FIG. 1, the output signal e of the first stage noise eliminating circuit 10 is applied to an input terminal 37 and is supplied to n delay circuits $38_1$ through $38_n$ which are coupled in parallel. Delay times of the delay circuits $38_1$ through $38_n$ are selected so that the delay times are larger towards the delay circuit $38_n$ in the last stage. Output signals of the delay circuits $38_1$ through $38_n$ are supplied to respective coefficient multiplying circuits $39_1$ through $39_n$, and output signals of the coefficient multiplying circuits $39_1$ through $39_n$ are supplied to an adding circuit 40. Multiplying coefficients of the coefficient multiplying circuits $39_1$ through $39_n$ are set to such values that the impulse characteristic shown in FIG. 2B is obtainable. The adding circuit 40 adds the output signals of the coefficient multiplying circuits $39_1$ through $39_n$ and an output signal of the adding circuit 40 is supplied to an output terminal 42. The signal obtained through the output terminal 42 is supplied to the subtracting circuit 17 shown in FIG. 1 as the signal g described before. The output signal of the delay circuit $38_n$ which has the largest delay time is also supplied to an output terminal 41, and the signal obtained through the output signal 41 is supplied to the subtracting circuits 17 and 19 shown in FIG. 1 as the signal f described before.

The lowpass filter 12 shown in FIG. 1 has a circuit construction which is substantially the same as that of the lowpass filter shown in FIG. 7, however, the signal from the output terminal 41 is not used, and the coefficient multiplying circuits $39_1$ through $39_n$ having the mutually different multiplying coefficients are arranged in a reverse sequence to that of the coefficient multiplying circuits $39_1$ through $39_n$ of the lowpass filter 16. That is, when it is assumed that the coefficient multiplying circuits $39_1$ through $39_n$ respectively have multiplying coefficients $M_1$ through $M_n$ set in accordance with the impulse characteristic shown in FIG. 2B in the case where the lowpass filter 16 has the circuit construction shown in FIG. 7, multiplying coefficients of the coefficient multiplying circuits $39_1$ through $39_n$ are reversed and respectively set to $M_n$ through $M_1$ in the case where the lowpass filter 12 has the circuit construction shown in FIG. 7 so that the impulse characteristic shown in FIG. 2A is obtainable.

Figure 8:
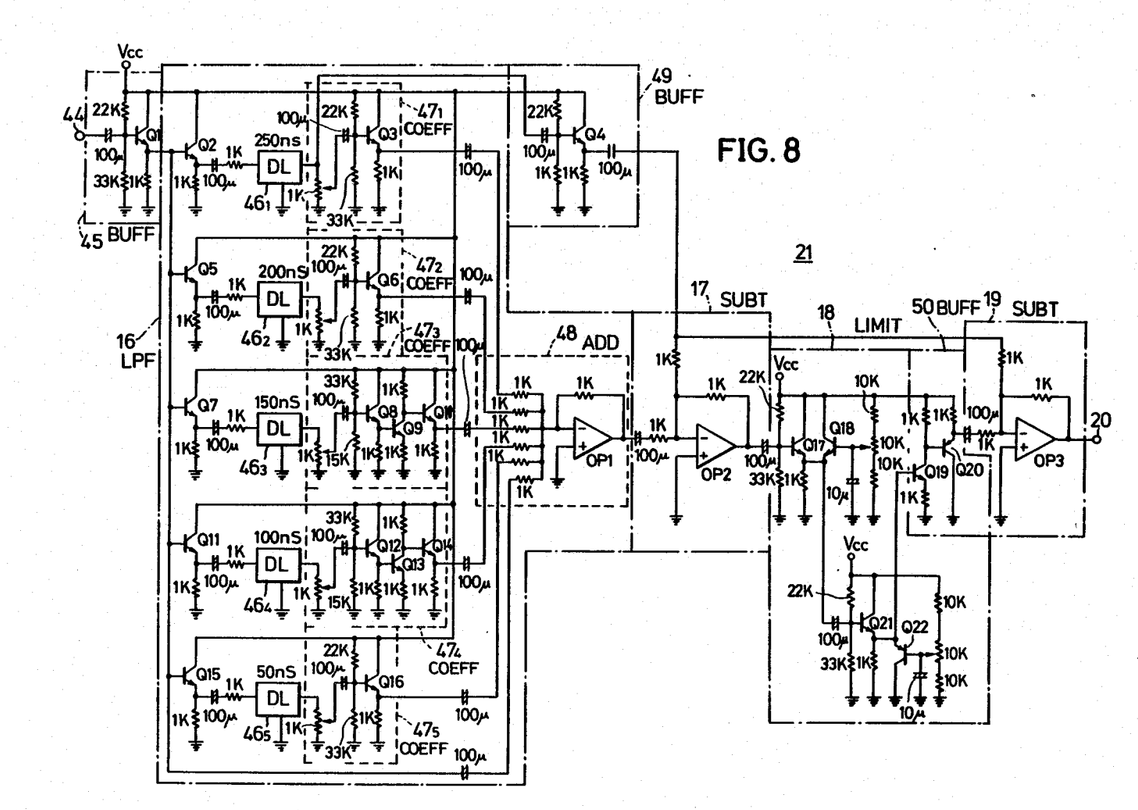
FIG. 8 is a circuit diagram showing an embodiment of a concrete circuit of the block system shown in FIG. 1.

FIG. 8 shows an embodiment of a concrete circuit of the second stage noise eliminating circuit 21 shown in FIG. 1. In FIG. 8, those parts which are the same are those corresponding parts in FIG. 1 are designated by the same reference numerals, and description thereof will be omitted. The output signal e of the first stage noise eliminating circuit 10 shown in FIG. 1 is applied to an input terminal 44 and is supplied to the lowpass filter 16 through a buffer amplifier 45 which comprises resistors, a capacitor, and a transistor Q1. The lowpass filter 16 comprises first through fifth delay parts, coefficient multiplying circuits $47_1$ through $47_5$, capacitors, and an adding circuit 48, and is basically the same as the lowpass filter shown in FIG. 7. The first delay part comprises resistors, a capacitor, a transistor Q2, and a delay element $46_1$. The second through fifth delay parts are constructed similarly as the first delay part, but delay times of delay elements $46_1$ through $46_5$ are respectively selected to 50 nsec, 100 nsec, 150 nsec, 200 nsec, and 250 nsec as shown. Outputs of the delay elements $46_1$ through $46_5$ are supplied to the respective coefficient multiplying circuits $47_1$ through $47_5$ wherein predetermined multiplying coefficients are multiplied. The coefficient multiplying circuits $47_1$, $47_2$, and $47_5$ have substantially the same circuit construction and each circuit comprises resistors, a variable resistor, a capacitor, and a transistor. The coefficient multiplying circuits $47_3$ and $47_4$ have substantially the same circuit construction and each circuit comprises resistors, a variable resistor, a capacitor, and transistors. Outputs of the coefficient multiplying circuits $47_1$ through $47_5$ are passed through the respective capacitors and are supplied to the adding circuit 48.

The adding circuit 48 comprises resistors and an operational amplifier OP1, and an output of the adding circuit 48 is supplied to the subtracting circuit 17. The subtracting circuit 17 comprises resistors, capacitors, and an operational amplifier OP2. On the other hand, the output of the delay element $46_1$ of the first delay part is supplied to the subtracting circuit 17 through a buffer amplifier 49. The buffer amplifier 49 comprises resistors, capacitors, and a transistor Q4. The subtracting circuit 17 performs a subtraction between the output of the adding circuit 48 and the output of the buffer amplifier 49 and supplies the subtracted result to the limiter 18. The limiter 18 comprises resistors, capacitors, and transistors Q17, Q18, Q21, and Q22. An output of the limiter 18 is supplied to the subtracting circuit 19 through a buffer amplifier 50 which comprises resistors and transistors Q19 and Q20. The subtracting circuit 19 comprises resistors, a capacitor, and an operational amplifier OP3. The subtracting circuit 19 performs a subtraction between the output of the buffer amplifier 49 and the output of the buffer amplifier 50 and supplies a subtracted result to the output terminal 20.

Figure 9:
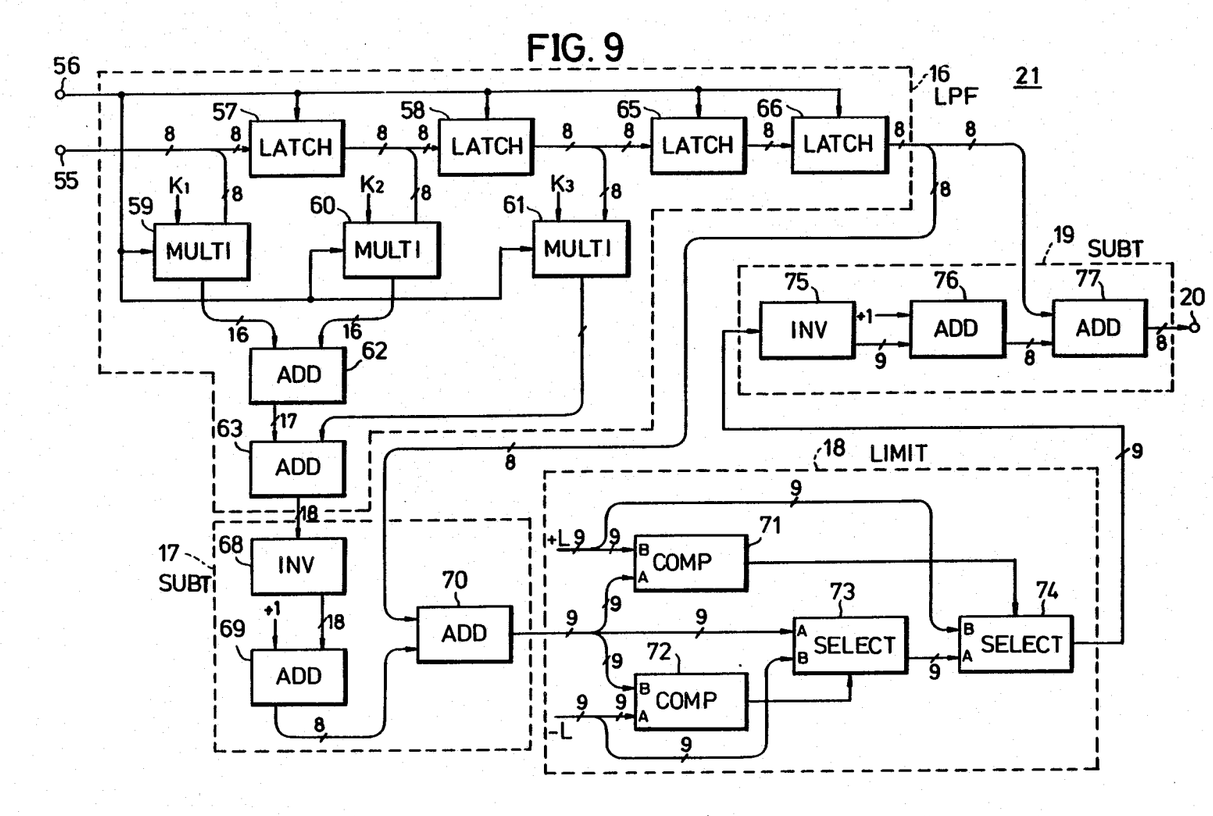
FIG. 9 is a system block diagram showing another embodiment of the concrete circuit of the block system shown in FIG. 1.
Figure 10:
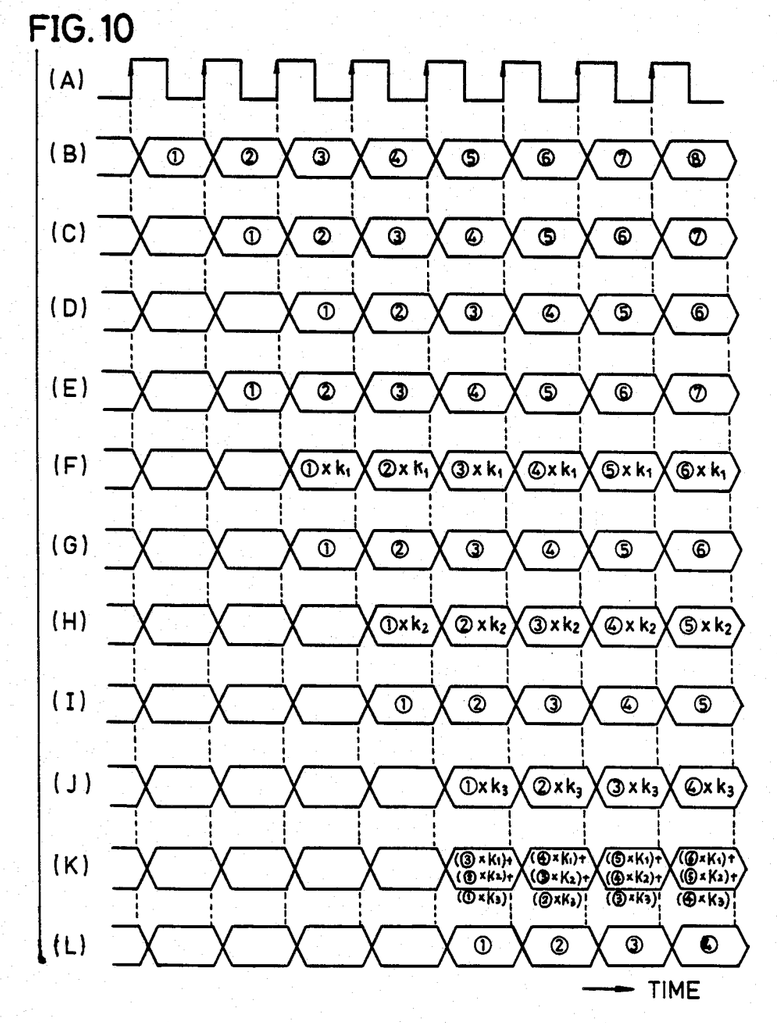

FIG. 9 shows another embodiment of a concrete circuit of the second stage noise eliminating circuit 21 shown in FIG. 1. In FIG. 9, those parts which have the same functions as those corresponding parts in FIG. 1 are surrounded by phantom lines and are designated by the same reference numerals. In the present embodiment, the noise component is eliminated by a digital signal circuit. In this case, the first stage noise eliminating circuit 10 is similarly constituted by a digital signal circuit, and an 8-bit digital signal which is obtained by subjecting an analog video signal to an analog-to-digital conversion and has a two's complement representation is applied to the input terminal 11. A digital signal corresponding to the signal e described before is applied to an input terminal 55, and a clock signal shown in FIG. 10(A) is applied to an input terminal 56.

The lowpass filter 16 comprises latch circuits 57, 58, 65, and 66, coefficient multiplying circuits 59 through 61, and adding circuits 62 and 63. The latch circuits 57 and 58 enter a datum in synchronism with the clock signal from the input terminal 56 and produce a datum received immediately before the incoming clock signal. In other words, the latch circuits 57 and 58 perform a delay corresponding to one period of the clock signal. For example, in the case where the clock signal has a frequency of 10 MHz, delay times of the latch circuits 57 and 58 are both selected to 100 nsec. The coefficient multiplying circuits 59 through 61 respectively multiply coefficients K1 through K3 to an input thereof, and each multiplying circuit has a built-in latch part in an input part and an output part thereof. The coefficient multiplying circuit 59 multiplies the multiplying coefficient K1 to the signal from the input terminal 55 and supplies a multiplied result to the adding circuit 62. The coefficient multiplying circuit 60 multiplies the multiplying coefficient K2 to an output of the latch circuit 57 and supplies a multiplied result to the adding circuit 62. The coefficient multiplying circuit 61 multiplies the multiplying coefficient K3 to an output of the latch circuit 58 and supplies a multiplied result to the adding circuit 63. The adding circuit 63 adds an output of the adding circuit 62 and the output of the coefficient multiplying circuit 61 and supplies an added result to an inverter 68 of the subtracting circuit 17. Accordingly, when a data sequence ①, ②, ③, ... shown in FIG. 10(B) is applied to the input terminal 55, the latch circuits 57 and 58 respectively produce data sequences shown in FIGS. 10(C) and 10(D). The coefficient multiplying circuit 59 through 61 respectively enter the data with timings shown in FIGS. 10(E), 10(G), and 10(I) and respectively produce the multiplied results with timings shown in FIGS. 10(F), 10(H), and 10(J). Hence, the adding circuit 63 produces the added result with a timing shown in FIG. 10(K).

The latch circuits 65 and 66 are provided to compensate for the delays introduced in the coefficient multiplying circuits 59 through 61. The latch circuits 65 and 66 latch input data therefore responsive to the clock signal from the input terminal 56. An output of the latch circuit 58 is supplied to the latch circuit 65, and an output of the latch circuit 65 is supplied to the latch circuit 66. The latch circuit 66 produces the data with a timing shown in FIG. 10(L) and the output data of the latch circuit 66 is supplied to an adding circuit 70 of the subtracting circuit 17.

The subtracting circuit comprises the inverter 68 and adding circuits 69 and 70. The inverter 68 inverts all of the bits of the output data of the adding circuit 63, and the adding circuit 69 adds "+1" to the output data of the inverter 68. The adding circuit 70 adds the output data of the adding circuit 69 and the output data of the latch circuit 66 and substantially performs a subtraction between the output data of the adding circuit 63 and the output data of the latch circuit 66. A subtracted result from the adding circuit 70 is supplied to comparators 71 and 72 and a data selector 73 of the limiter 18.

The limiter 18 comprises the comparators 71 and 72 and data selectors 73 and 74. The output data of the adding circuit 70 is supplied to an input terminal A of the comparator 71, and a positive limiting level "+L" of the limiter 18 is supplied to an input terminal B of the comparator 71. A negative limiting level "−L" is supplied to an input terminal A of the comparator 72, and the output data of the adding circuit 70 is supplied to an input terminal B of the comparator 72. The comparators 71 and 72 are designed to produce a high-level signal when the signal level at the input terminal A is greater than that at the input terminal B. Outputs of the comparators 71 and 72 are respectively supplied to data select terminals of the data selectors 73 and 74. The output data of the adding circuit 70 and the negative limiting level "−L" are respectively supplied to input terminals A and B of the data selector 73, and an output data of the data selector 73 and the positive limiting level "+L" are respectively supplied to input terminals A and B of the data selector 74. The data selectors 73 and 74 are designed to selectively produce the signal received at the input terminal A when the signal level at the data select terminal is low and to selectively produce the signal received at the input terminal B when the signal level at the data select terminal is high. Hence, the data having the level thereof limited within the limiting range of −L to +L is obtained from the data selector 74 and is supplied to an inverter 75 of the subtracting circuit 19.

The subtracting circuit 19 comprises the inverter 75 and adding circuits 76 and 77. The operation of the subtracting circuit 19 is substantially the same as that of the subtracting circuit 17 described before, and description thereof will be omitted for this reason. The subtracting circuit 19 performs a subtraction between the output data of the latch circuit 66 and the output data of the data selector 74 and supplies a subtracted result to the output terminal 20.

In the circuit shown in FIG. 9, commercially available circuits 74S374, 008HJ5C1, 74S283, 74S04, 74S85, and 74S157, for example, may be used for the latch circuits, the coefficient multiplying circuits, the adding circuits, the inverters, the comparators, and the data selectors, respectively.

As described before, according to the noise reduction circuit of the present invention, the signal f which is obtained by delaying the signal e by the predetermined delay time is obtained from a part of the lowpass filter 16 shown in FIG. 1. Accordingly, it is unnecessary to provide a delay circuit exclusively for obtaining the signal f and the circuit construction is simple.

In addition, the input video signal (input luminance signal) applied to the input terminal 11 may be a digital signal. Hence, the noise reduction circuit may be constituted by inexpensive digital circuits and the noise reduction circuit can be manufactured in the form of an integrated circuit with ease. Further, since the characteristic of each digital circuit constituting the noise reduction circuit is consistent compared to that of a corresponding analog circuit, the characteristic of the noise reduction circuit as a whole becomes consistent. The digital noise reduction circuit is especially unaffected by a change in the ambient temperature.

In the embodiment shown in FIG. 1, the first stage noise eliminating circuit 10 eliminates the noise component existing at parts other than the parts immediately after the rise and immediately after the fall in the input luminance signal, and the second stage noise eliminating circuit 21 eliminates the noise component remaining at parts immediately after the rise and immediately after the fall in the luminance signal which is processed in the first stage noise eliminating circuit 10. However, it is possible to first pass the input luminance signal through the second stage noise eliminating circuit 21 and then through the first stage noise eliminating circuit 10. In this case, the second stage noise eliminating circuit 21 eliminates most of the noise components in the input luminance signal, and the first stage noise eliminating circuit 10 eliminates the noise component remaining at parts immediately before the rise and immediately before the fall in the luminance signal which is processed in the second stage noise eliminating circuit 21. As a result, effects which are the same as those obtained in the embodiment shown in FIG. 1 are also obtainable in this case. In other words, it is possible to effectively eliminate the noise component existing immediately after the rise in the luminance signal of the reproduced video signal.

Further, the present invention is not limited to these embodiments, but various variations and modifications may be made without departing from the scope of the present invention.

What is claimed is:

1. A noise reduction circuit for video signal comprising:
   first circuit means supplied with an input video signal for obtaining from the input video signal a high frequency component including a noise component, said first circuit means comprising a filter part having a first impulse characteristic;
   first limiter means for amplitude-limiting large amplitude parts of an output of said first circuit means;
   first subtracting means for performing a subtraction between said input video signal and an output of said first limiter means and for producing a video signal which has been practically eliminated of the noise component;
   second circuit means supplied with the output video signal of said first subtracting means for obtaining a noise component remaining at parts immediately after or before rises and falls in the video signal, said second circuit means comprising a filter part having a second impulse characteristic which is complementary to said first impulse characteristic;
   second limiter means for amplitude-limiting large amplitude parts of an output of said second circuit means; and second subtracting means for performing a subtraction between the output of said first subtracting means and an output of said second limiter means and for producing a video signal which has been substantially eliminated of all the noise component.

2. A noise reduction circuit as claimed in claim 1 in which said first circuit means comprises a first lowpass filter supplied with said input video signal and a first subtracting circuit for performing a subtractiong between an output of said first lowpass filter and said input video signal and for supplying a subtracted result to said first limiter means, and said second circuit means comprises a second lowpass filter supplied with the output video signal of said first subtracting means and a second subtracting circuit for performing a subtraction between an output of said second lowpass filter and a delayed signal and for supplying a subtracted result to said second limiter means, said delayed signal being obtained from within said second lowpass filter and being the output video signal of said first subtracting means which is delayed by a predetermined delay time.

3. A noise reduction circuit as claimed in claim 2 in which said first lowpass filter has a first impulse characteristic wherein an amplitude decreases with time and said second lowpass filter has a second impulse characteristic wherein an amplitude increases with time.

4. A noise reduction circuit as claimed in claim 2 in which said second lowpass filter comprises n delay circuits which are coupled in series and have the same delay time, n+1 coefficient multiplying circuits, and an adding circuit for adding outputs of each of said coefficient multiplying circuits and for supplying an added result to said second subtracting circuit, said delay circuits and said coefficient multiplying circuits being coupled to each other so that said output video signal of said first subtracting means is supplied to the delay circuit in a first stage and the coefficient multiplying circuit in a first stage, an output of the delay circuit in an I-th stage is supplied to the delay circuit in an (I+1)-th stage and the coefficient multiplying circuit in an (I+1)-th stage, where I=1, 2, ..., n−1, and an output of the delay circuit in an n-th stage is supplied to the coefficient multiplying circuit in an (n+1)-th stage and to said second subtracting means as said delayed signal.

5. A noise reduction circuit as claimed in claim 4 in which said first lowpass filter has a circuit construction which is substantially the same as that of said second lowpass filter, and coefficient multiplying circuits of said first lowpass filger having mutually different multiplying coefficients are arranged in a reverse sequence to that of the coefficient multiplying circuits of said second lowpass filter.

6. A noise reduction circuit as claimed in claim 2 in which said second lowpass filter comprises n delay circuits which are coupled in parallel and have mutually different delay times, n coefficient multiplying circuits supplied with outputs of the respective delay circuits, and an adding circuit for adding outputs of each of said coefficient multiplying circuits and for supplying an added result to said second subtracting circuit, said delayed signal being obtained from one of said delay circuits having a largest delay time.

7. A noise reduction circuit as claimed in claim 6 in which said first lowpass filter has a circuit construction which is substantially the same as that of said second lowpass filter, and coefficient multiplying circuits of said first lowpass filter having mutually different multiplying coefficients are arranged in a reverse sequence to that of the coefficient multiplying circuits of said second lowpass filter.

8. A noise reduction circuit as claimed in claim 1 in which said input video signal is a digital signal.

* * * * *